United States Patent
Hebbalalu et al.

(10) Patent No.: US 6,806,910 B2
(45) Date of Patent: Oct. 19, 2004

(54) PROCESSING MULTIPLE STREAMS OF DATA ENCODED IN RESPECTIVE VBI CHANNELS WITH A SHARED EQUALIZER

(75) Inventors: Kumar Satyanarayana Hebbalalu, San Jose, CA (US); Arvind Vinayak Lonkar, Santa Clara, CA (US); Oscar Ayzenberg, Cupertino, CA (US)

(73) Assignee: Zoran Microelectronics Ltd., Haifa (IL)

(*) Notice: Subject to any disclaimer, the term of this patent is extended or adjusted under 35 U.S.C. 154(b) by 376 days.

(21) Appl. No.: 09/754,948

(22) Filed: Jan. 4, 2001

(65) Prior Publication Data

US 2002/0085115 A1 Jul. 4, 2002

(51) Int. Cl.[7] .............................................. H04N 7/00
(52) U.S. Cl. ...................................... 348/465; 348/614
(58) Field of Search ................................ 348/465, 468, 348/614, 731, 553, 706

(56) References Cited

U.S. PATENT DOCUMENTS 4,625,241 A * 11/1986 Ohzeki ....................... 358/147
5,040,211 A * 8/1991 Schreiber ..................... 380/14
6,246,444 B1 * 6/2001 Kim ........................... 348/614
6,480,239 B1 * 11/2002 Patel et al. ................. 348/614

* cited by examiner

Primary Examiner—Victor R. Kostak
(74) Attorney, Agent, or Firm—Parsons Hsue & de Runtz LLP

(57) ABSTRACT

A circuit for recovering the data encoded in several VBI channels without requiring a large number of gates. An analog to digital converter (ADC) and a clock and data recovery circuit may be associated with one of several possible channels. ADC over samples each VBI channel, and clock and data recovery circuit determines which subset of the over samples represent the encoded data by examining the over sampled samples. The selected subset may be stored in a shared memory and a equalizer may process the subset of samples of all channels to perform tasks such as deghosting. Due to the shared equalizer, the number of required gates may be minimized.

13 Claims, 3 Drawing Sheets

PROCESSING MULTIPLE STREAMS OF DATA ENCODED IN RESPECTIVE VBI CHANNELS WITH A SHARED EQUALIZER

BACKGROUND OF THE INVENTION

1. Field of the Invention

The present invention relates to television systems and more specifically to a method and apparatus for processing multiple streams of data encoded in respective vertical blanking interval (VBI) channels.

2. Related Art

Data is often encoded along with images and voice in television signals. Typically, a channel ("television signal channel") of a television signal contains a program component (which specifies the displayed images and accompanying audio component) and synchronization signals. The synchronization signals specify the transitions to next horizontal lines within an image frame, and between image frames. The portion of television signal received corresponding to transition between image frames is commonly referred to as vertical blanking interval (VBI).

Data is often encoded in VBI channels. Examples of such data include teletext data and extended data services (XDS) related data. Typically, a broadcaster includes the data in VBI portion and a user system (e.g., a set-top operating in conjunction with a television system, or a chip-set implemented within a television system) may need to recover the data.

A user system may further need to recover the data encoded in multiple VBI channels, with each VBI channel being related to a television signal channel. Such a need may exist, for example, when a user system needs to display closed captioning data received on one channel while recovering television guide type data received on another channel in parallel.

Recovery of data in each VBI channel often requires the implementation of an equalizer to perform a task commonly referred to as deghosting. Deghosting in turn refers to eliminating any faint second images which may be otherwise present in television displays due to noise components resulting from phenomenon such as echo. Deghosting is often implemented using integrated circuits executing software/firmware instructions.

In a prior embodiment, an equalizer may be implemented associated with VBI channel. Unfortunately, such a solution may require a large number of gates (components), which consume an unacceptable amount of space and electrical power. Accordingly, what is needed is a method and apparatus which enables data in multiple streams of a VBI channels to be recovered without requiring an excessive number of gates.

SUMMARY OF THE INVENTION

The present invention minimizes the number of gates required for recovering data elements from multiple VBI channels by sharing an equalizer among the multiple television signal channels. An ADC and a clock and data recovery circuit may be associated with each channel. The ADC over samples at least the VBI portion of the channel.

The clock and data recovery circuit examines the over sampled samples to recover the encoding clock used to encode the data, and selects a subset of the over sampled samples according to the recovered clock. A memory potentially shared by all the channels, may store the subset of the samples related to all the channels.

An equalizer then processes the subsets of samples to perform tasks such as deghosting, and the data elements in the VBI channels may be recovered as a result. In one embodiment, the equalizer is implemented as a fractional equalizer well known in the relevant arts.

An embodiment of the above described recovery circuit is implemented within a television system. Another embodiment may be implemented within a set-top box. However, it should be appreciated that the present invention may be implemented in, among others, any devices which process VBI channels.

Thus, an aspect of the present invention enables the number of gates in a data recovery circuit to be minimized as an equalizer may be shared among several paths, with each path generating digital data elements potentially with ghosting effects.

An aspect of the present invention enables the space and energy consumption to be minimized as the number of gates required to implement data recovery circuit may be minimized.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Present Invention

According to an aspect of the present invention, an equalizer is shared by multiple paths, each recovering the data in a corresponding VBI channel. As a result, the number of gates required in the overall solution may be reduced. The reduction in gates may lead to decrease in the space and electrical power consumed by the data recovery solution.

The present invention is described below in further detail with reference to several examples for illustration. One skilled in the relevant art, however, will readily recognize that the invention can be practiced in other environments without one or more of the specific details, or with other methods, etc. In other instances, well-known structures or operations are not shown in detail to avoid obscuring the invention.

2. Example Embodiment

Figure 1:
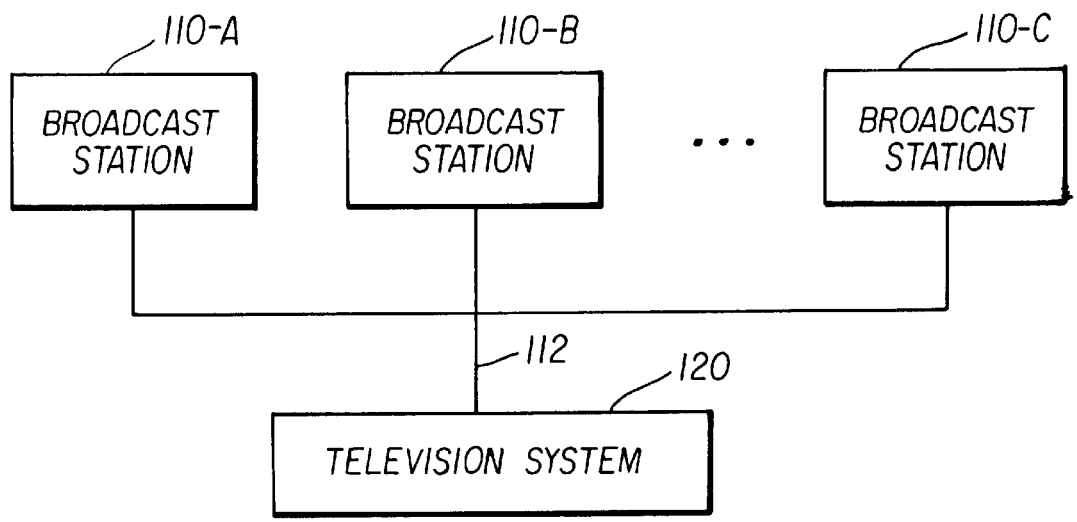
FIG. 1 is a block diagram illustrating an example environment in which the present invention can be implemented.

FIG. 1 depicts an example environment in which the present invention cab be implemented. There is shown television system 120 receiving a television signal channel from each of broadcast stations 110-A-A, 110-B and 110-C. Broadcast stations 110-A, 110-B, and 110-C will be collectively or individually referred to by reference numeral as will be clear from the context.

Each broadcast station 110 generates a television signal channel containing data encoded in the VBI portion. Broadcast station 110 may be implemented in a known way. Television system 120 receives the television signal channels and recovers the encoded data while minimizing the number of gates required for such recovery. While the present invention is described with reference to recovering the data within television system, it should be understood that the invention may be implemented outside of a television system also. For example, a set-top box may be conveniently implemented to recover the data encoded in a television signal channel.

The invention is described below with reference to further examples. It is helpful to first understand an example environment which does not use the present invention.

3. Circuit Not Using the Present Invention

Figure 2:
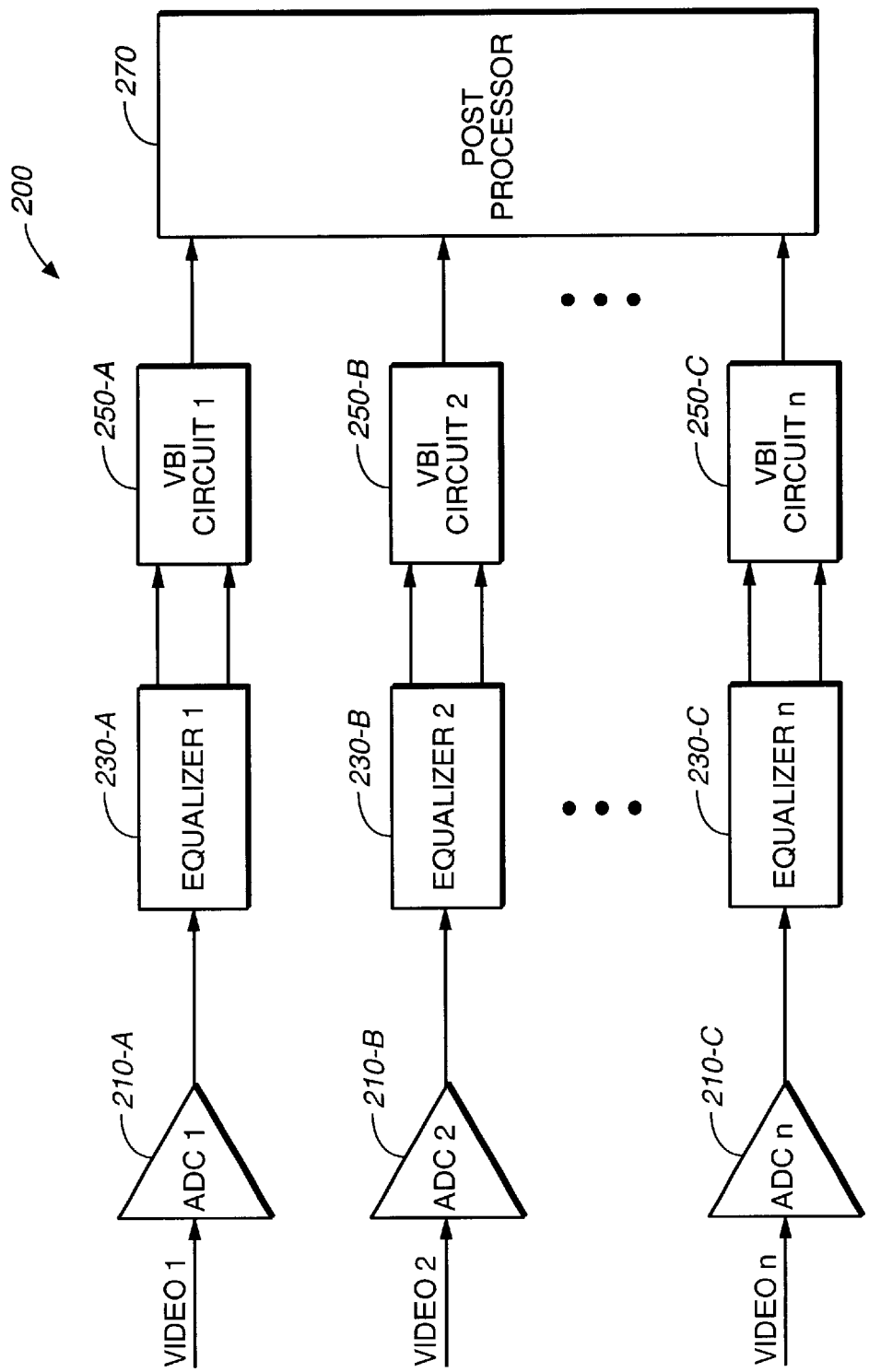
FIG. 2 is a block diagram illustrating some disadvantages with a prior solution which recovers data encoded in multiple channels.

FIG. 2 is a block diagram of a circuit illustrating an example prior circuit 200 which does not use the present invention. Circuit 200 is shown containing analog to digital converters (ADC) 210-A through 210-C, equalizers 230-A through 230-C, VBI circuits 250-A through 250-C, and post-processor 270. As may be readily observed, three paths are present for processing each of the three television signal channels. The description of the three paths is provided with reference to only one path for conciseness.

ADC 210-A over samples (e.g., by a factor within a range of 4–7) a received television signal channel to generate over sampled elements. Equalizer 230-A processes the over sampled elements to perform a deghosting operation. As noted above, deghosting generally refers to eliminating a faint secondary image that may be generated in conjunction with a primary (intended) image. The faint secondary image may have been introduced into the television signal due to factors such as echo noise. The output of equalizer 230-A may be generated at the same frequency as the frequency at which data is encoded in the VBI portion.

VBI circuit 250-A receives the output of equalizer and recovers the encoded data based on the run-in signal portion present in each line. ADC 210-A, equalizer 230-A and VBI circuit 250-A may be implemented in a known way. Post processor 270 processes the recovered data according to the specific desired application. For example, if the data merely needs to be displayed on a display screen, the text/image to be displayed may be assembled.

It may be noted from the description of FIG. 2 that implementation of circuit 200 may require a large number of gates, which may consume an undesirable amount of space and/or electrical power. As described below, a circuit in accordance with the present invention overcomes such disadvantages.

4. VBI Data Recovery Circuit

Figure 3:
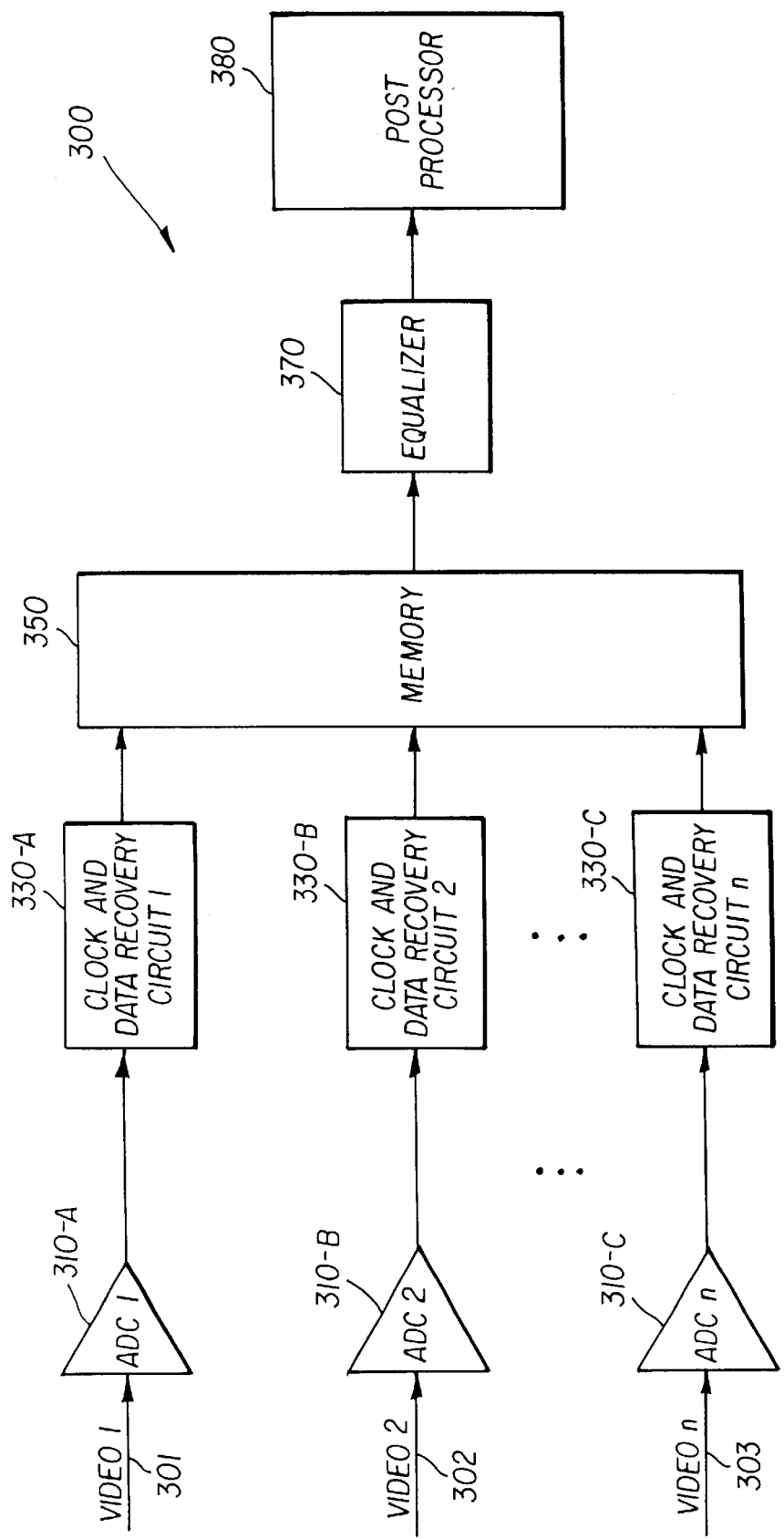
FIG. 3 is a block diagram illustrating the details of an embodiment which recovers the data encoded in multiple VBI channels in accordance with the present invention.

FIG. 3 is a block diagram depicting an example VBI data recovery circuit 300 in accordance with the present invention. Circuit 300 is shown containing ADCs 310-A through 310-C, clock and data recovery circuits 330-A through 330-C, memory 350, equalizer 370 and post-processor 380. Again, the elements in only one of the three representative paths are described below for conciseness.

ADC 310-A over samples a television signal channel by a over sampling factor (e.g., in the range of 4–6), and the over sampled samples are presented to clock and data recovery circuit 330-A. Clock and data recovery circuit 330 examines the over sampled samples to recover the encoding clock and thus identify which of the over sampled samples to select as representing the input signal to ADC 310-A. Thus, the output of clock and data recovery circuit 330 is at the same frequency as the frequency at which data is encoded. The selected samples may be referred to as a subset of the over sampled samples.

Memory 350 is used to store the samples selected by the three clock and data recovery circuits 330-A through 330-C. Equalizer 370 processes the samples of each channel to perform a deghosting operation. The output of equalizer 370 represents the recovered deghosted data for the three channels. In one embodiment, equalizer 370 is implemented as a non-fractional equalizer and may thus be implemented in a known way.

Post-processor 380 processes the recovered data according to the specific application(s) for which the data is intended for. In an embodiment, equalizer 370 is implemented as a co-processor to post-processor 380 such that the deghosting task can be effectively delegated without substantial overhead to post-processor. In general, a the operation of a co-processor requires the cooperation of another processor.

It should be understood that a single equalizer is shared by multiple paths, which provides several benefits. For example, the number of gates required to implement the overall solution may be minimized. In addition, by decoupling the equalizer operation from the clock recovery, the solution may be implemented without a phase-lock loop (PLL). The manner in which circuit 300 may be used within an example user system is described below.

5. Television System

Figure 4:
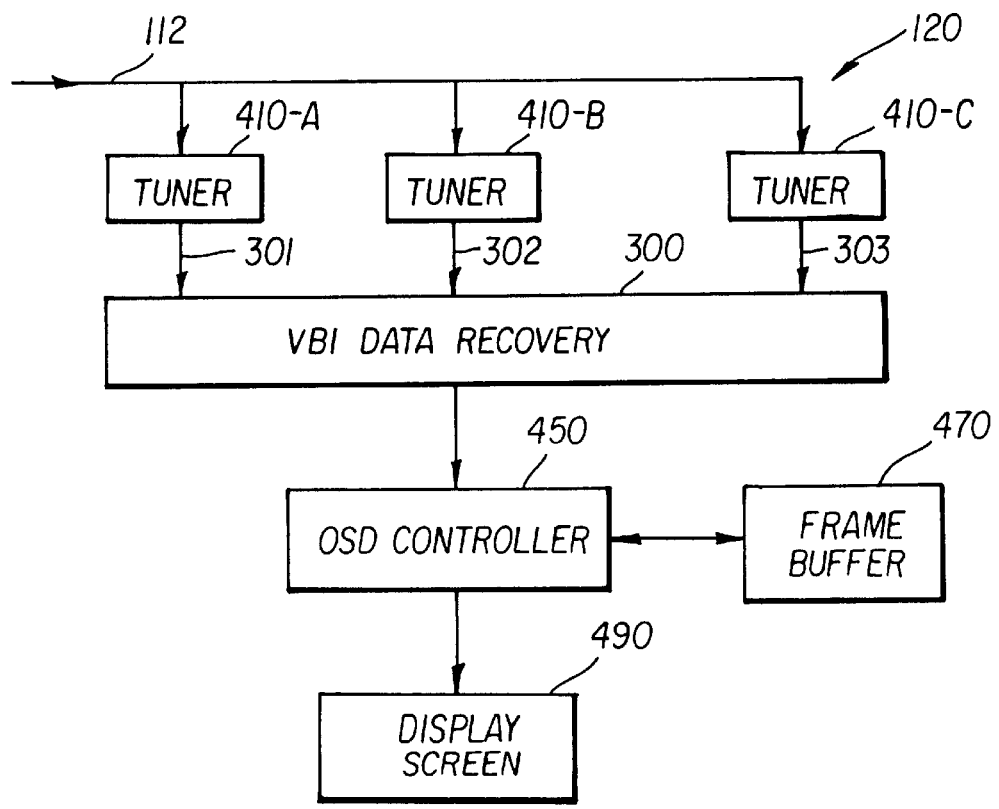
FIG. 4 is a block diagram illustrating an embodiment of a television system implemented in accordance with the present invention.

FIG. 4 is a block diagram illustrating the internals of television system 120 in one embodiment. For purpose of illustration it will be assumed that the data recovered from the VBI channel merely needs to be displayed as teletext data. However, the recovered data can be used for other purposes as well, usually consistent with a protocol convention. Television system 120 is shown containing three tuners 410-A through 410-C, VBI data recovery circuit 300 (described above with reference to FIG. 3), on-screen display (OSD) controller 450, frame memory 470, and display screen 490. Each component is described below in further detail.

Each of the tuners 410-A through 410-C receives multiple television signal channels on path 112, and selects one of the received channels. The three channels are provided as inputs to VBI data recovery circuit 300 on lines 301–303. VBI data recovery circuit 300 may recover the data encoded in the three VBI channels as described above with reference to FIG. 3. The recovered data from the three channels is provided to OSD controller 450.

OSD controller 450 controls the display on display screen 490. Based on the data received from VBI data recovery circuit 300 and the image frames received on the three television signal channels selected by tuners 410-A through 410-C, OSD controller 450 may generate an image frame for display on display screen. OSD controller 450 may contain elements such as analog to digital converter (ADC) to flexibly combine an image representing the recovered data with the images encoded in the television signal display portion.

Frame buffer 470 provides any intermediate storage necessary for OSD controller 450 to generate a single image based on four sources, i.e., VBI data and the three recovered television signal images. A user may specify whether/how each of the three images is to be eventually displayed on display screen 490. OSD controller 450 generates signals consistent with the interface requirements of display screen 490 to display the desired images.

6. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A circuit for recovering a plurality of data elements encoded in multiple television signal channels at an encoding frequency, said circuit comprising:
   a plurality of circuit paths, individually having:
      an analog to digital converter (ADC) over sampling one of said multiple television signal channels at a over-sampling frequency to generate a plurality of over sampled samples, wherein said over-sampling frequency is higher than said encoding frequency; and
      a clock and data recovery circuit examining said plurality of over sampled samples to select a subset of said plurality of over sampled samples, said subset being generated at said encoding frequency;
   a memory storing said subset of said plurality of over sampled samples from the plurality of circuit paths; and
   an equalizer processing the subsets stored in said memory to generate said plurality of data elements, said equalizer processing outputs of the plurality of circuit paths.

2. The circuit of claim 1, further comprising a post-processor receiving said plurality of data elements generated by said equalizer, said post-processor processing said received plurality of data elements according to an application to which said data elements are to be sent.

3. The circuit of claim 2, wherein said equalizer is implemented as a co-processor to said post-processor.

4. The circuit of claim 1, wherein said equalizer comprises a non-fractional equalizer.

5. A circuit for recovering a plurality of data elements encoded in a television signal channel at an encoding frequency, said circuit comprising:
   an analog to digital converter (ADC) over sampling said television signal channel at a over-sampling frequency to generate a plurality of over sampled samples, wherein said over-sampling frequency is higher than said encoding frequency;
   a clock and data recovery circuit examining said plurality of over sampled samples to select a subset of said plurality of over sampled samples, said subset being generated at said encoding frequency;
   wherein said ADC and said clock and data recovery circuit are comprised in a first path, said circuit further comprising at least one more path comprising another ADC and another clock and data recovery circuit,
   a memory storing said subset of said plurality of over sampled samples; and
   an equalizer processing said subset stored in said memory to generate said plurality of data elements,
   wherein said equalizer processes the output of all clock and data recovery circuits.

6. The circuit of claim 5, wherein each of said paths stores a corresponding subset of over sampled samples in said memory and said equalizer processes said subsets by accessing said memory.

7. A television system comprising:
   a plurality of tuners, each tuner selecting one of a plurality of television signal channels; and
   a VBI data recovery circuit recovering a plurality of data elements encoded in a VBI portion of each of said television signal channels, said VBJ data recovery circuit comprising:
      an analog to digital converter (ADC) and a clock and data recovery circuit associated with each of said plurality of tuners, said ADC over sampling at least said VBI portion of a corresponding television signal channel to generate a plurality of over sampled elements, said clock and data recovery circuit recovering a clock signal by examining said over sampled elements and selecting a subset of said over sampled elements according to said recovered clock signal;
      a memory storing said subset of said over sampled signals corresponding to each of said television signal channels; and
      an equalizer processing said subsets stored in said memory to recover said plurality of data elements encoded in each of a corresponding television signal channel,
   wherein said recovered plurality of data elements are used in said television system, and wherein using said equalizer for all of said television signals channel minimizes the number of gates used to implement said VBI data recovery circuit.

8. The television system of claim 7, further comprising a post-processor receiving said plurality of data elements generated by said equalizer, said post-processor processing said received plurality of data elements according to an application to which said data elements are to be sent.

9. The television system of claim 8, wherein said equalizer is implemented as a co-processor to said post-processor.

10. The television system of claim 7, wherein said equalizer comprises a non-fractional equalizer.

11. The television system of claim 7, wherein said ADC and said clock and data recovery circuit are comprised in a first path, said circuit further comprising at least one more path comprising another ADC and another clock and data recovery circuit, wherein said equalizer processes the output of all clock and data recovery circuits.

12. The television system of claim 11, wherein each of said paths stores a corresponding subset of over sampled samples in said memory and said equalizer processes said subsets by accessing said memory.

13. The circuit of any one of claims 1–6, wherein the equalizer generates said plurality of data elements by performing a deghosting task.

* * * * *

UNITED STATES PATENT AND TRADEMARK OFFICE
CERTIFICATE OF CORRECTION

PATENT NO. : 6,806,910 B2
DATED : October 19, 2004
INVENTOR(S) : Kumar Satyanarayana Hebbalalu, Arvind Vinayak Lonkar and Oscar Ayzenberg It is certified that error appears in the above-identified patent and that said Letters Patent is hereby corrected as shown below:

Column 6,
Line 12, after "channels, said", please delete "VBJ" and insert -- VBI --.

Signed and Sealed this

Second Day of August, 2005

JON W. DUDAS
*Director of the United States Patent and Trademark Office*